Figure 1:
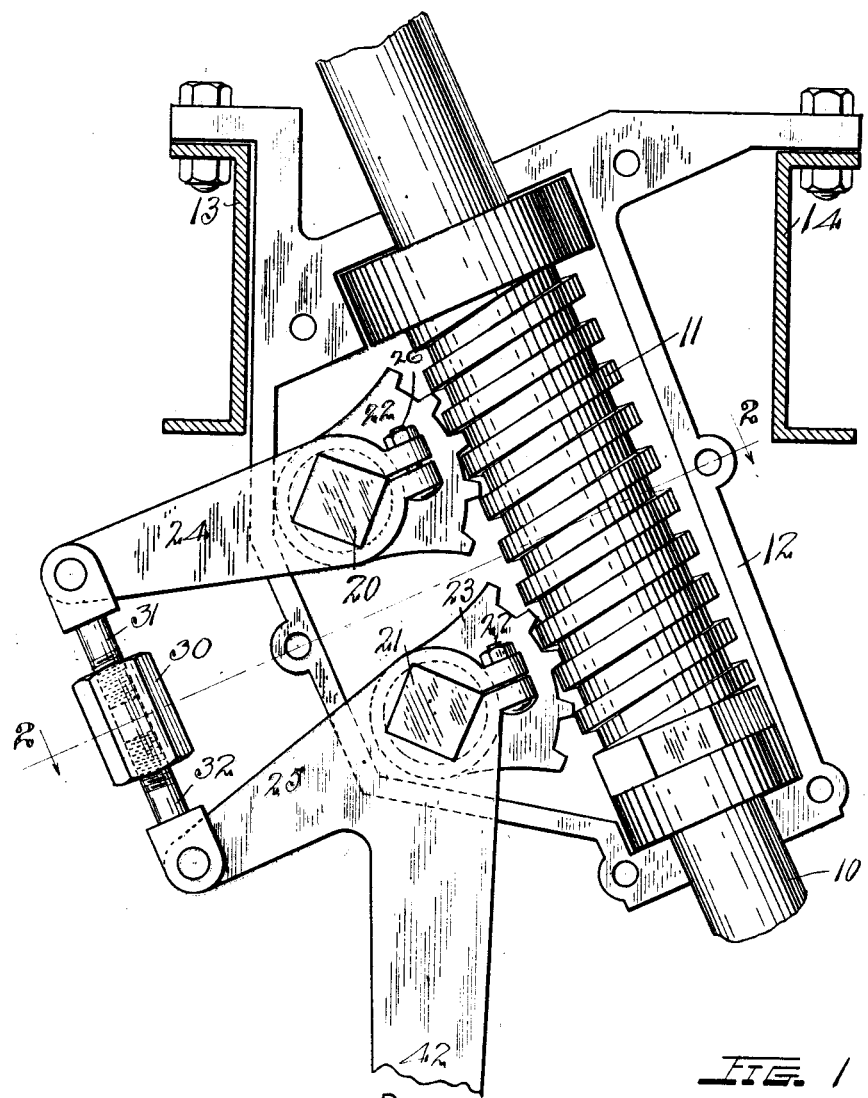

VAN ZANDT M. MOORE.
STEERING GEARING.
APPLICATION FILED MAR. 15, 1911.

1,033,442.

Patented July 23, 1912.
2 SHEETS—SHEET 1.

VAN ZANDT M. MOORE.
STEERING GEARING.
APPLICATION FILED MAR. 15, 1911.
1,033,442.
Patented July 23, 1912.
2 SHEETS—SHEET 2.
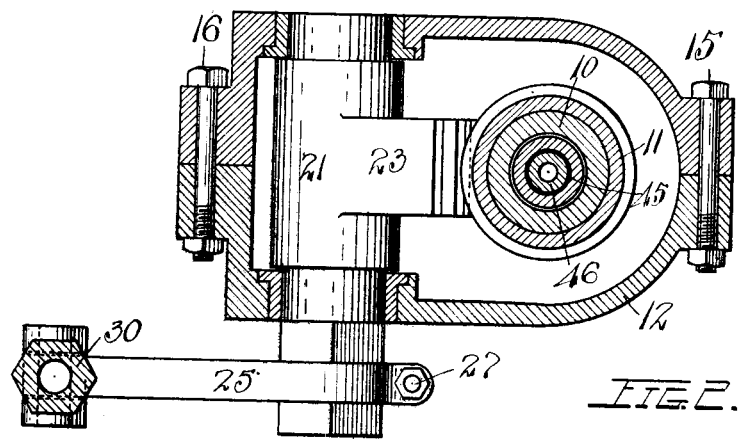
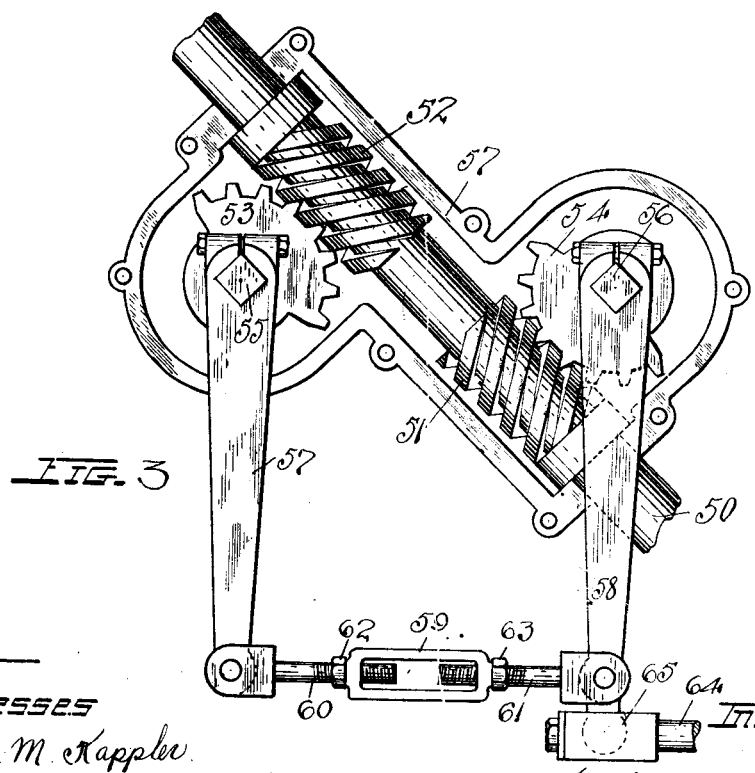

UNITED STATES PATENT OFFICE.

VAN ZANDT M. MOORE, OF CLEVELAND, OHIO.

STEERING-GEARING.

1,033,142.

Specification of Letters Patent.

Patented July 23, 1912.

Application filed March 15, 1911. Serial No. 614,542.

*To all whom it may concern:*

Be it known that I, VAN ZANDT M. MOORE, a citizen of the United States, residing at Cleveland, in the county of Cuyahoga and State of Ohio, have invented a certain new and useful Improvement in Steering-Gearing, of which the following is a full, clear, and exact description, reference being had to the accompanying drawings.

This invention relates to worm and worm wheel gearing and its object is to prevent back lash or looseness therein.

Worm and worm wheel gearing is advantageously employed where not only comparatively great power is desired, but where it is also desired to have the mechanism self-locking, it being a characteristic of such gearing, when properly proportioned, that the worm may drive the worm wheel, while the worm wheel may not drive the worm. In various cases, as for example, where the worm is intended to turn the worm wheel in either direction, difficulty is experienced from the back lash. Owing to the peculiar form of the teeth there has always been considerable of this back lash and the comparatively great friction of the worm and worm wheel causes constant wear, increasing this play. In automobile steering, for example, where worm and worm wheel gearing is employed, this looseness or back lash is particularly troublesome, because, after the steering wheel has been turned in one direction and is then being turned in the opposite direction, there is a material interval where the worm is out of driving contact with the worm wheel, that is, when the thread of the worm is passing from one side of the wheel tooth to the opposite face of the adjacent tooth. This renders the steering unsteady and interferes with the accurate control of the vehicle.

In my invention, which obviates the difficulty referred to, I provide two worm wheels which are relatively constrained so that one presents its teeth to one side of the worm thread while the other presents its teeth to the other side. The mechanism to be driven is coupled with both worm wheels, so that, when the worm is rotated in one direction, there is a driving through one worm wheel and when the rotation of the worm is in the opposite direction there is an immediate driving through the other worm wheel without the objectionable lost interval.

My invention comprises such mechanism broadly considered and also the more particular adaptations thereof illustrated herein and hereinafter more fully described.

In the drawings, Figure 1 is a side elevation of one type of worm and worm wheel gearing embodying my invention; Fig. 2 is a cross section thereof, as indicated by the line 2—2 of Fig. 1; Fig. 3 is a side elevation of a modified form of the gearing.

Referring first to Figs. 1 and 2, 10 represents a suitable shaft having a worm 11. This worm shaft is shown as journaled in a suitable casing 12, which is mounted on supports 13 and 14. The casing is shown as made in two parts connected by bolts 15 and 16. Of course, this casing and support is illustrative of any casing and support.

Journaled in the two parts of the casing are a pair of shafts 20 and 21, which respectively carry worm wheels 22 and 23 having their teeth in mesh with the worm 11. These worm wheels are shown as segments. On the outer side of the casing there are two arms 24 and 25 rigidly secured to the respective shafts 20 and 21. This may be conveniently accomplished by providing the shafts with squared ends and clamping the arms by bolts 26, 27. The arms 24 and 25 are constrained together so as to cause the worm wheels to bear in opposite direction against the worm. This constraining is shown as accomplished by a turn buckle, consisting, as shown, of a threaded sleeve 30 having right and left internal threads which receive the threaded shanks 31 and 32 of links pivoted respectively to the arms 24, 25. It will be seen that, by tightening this turn buckle, any back lash may be taken up, so that the worm wheel 22 always has a tooth in engagement with the under face of the thread on the worm while the worm wheel 23 always has a tooth in engagement with the upper face of the thread. With such construction it is only necessary to connect the driven mechanism at any suitable point with the composite worm wheel structure to make an effective drive.

As shown in Fig. 1, 40 represents a link, which may be considered as leading to the steering wheels, not shown, of an automobile. On the head of this link is a spherical recess, occupied by the ball end 41 of an arm 42 which is rigidly mounted on the squared end of the shaft. As shown, the arm 42 and the arm 25 are one integral piece.

It is customary, in order the construction, to make the worm shaft tubular and mount within it other shafts, and such is the construction illustrated in Fig. 2, there being two shafts 45 and 46 within the worm shaft which may control the fuel supply and the sparking, as usual.

In Fig. 3 is shown a somewhat modified form where there are two worms with their threads extending in opposite directions and the two worm wheels are mounted on opposite sides of the shaft. In that view, 50 represents the worm shaft; 51 and 52 right and left hand worms thereon; 53 and 54 the two worm wheels meshing with the respective worms; 55 and 56 the shafts of the respective worm wheels and 57 the casing in which such parts are mounted. On the shafts 55 and 56, respectively, are the arms 57 and 58, which are constrained toward each other by the turn buckle 59 screwing onto the links 60 and 61, which are provided with right and left hand threads. Suitable jam nuts 62 and 63 lock the turn buckle. 64 indicates the member connected to the driven mechanism and this member is shown as having a head with a spherical recess occupied by the ball end 65 of the arm 58. In this construction the tightening of the turn buckle causes the teeth of the worm wheel 53 to bear against the under face of the right hand worm 51.

It will be seen that either construction described is very simple and requires few extra parts above the ordinary worm mechanism. At the same time, the undesirable back lash is entirely obviated. While I have illustrated my invention in these two forms, I do not wish to limit myself thereto, as other embodiments may be made by those skilled in this art without departing from my invention.

Having thus described my invention, what I claim is:—

1. In mechanism of the class described, the combination, with a driving member having worm threads, of a plurality of pivotally mounted driven members engaging therewith at different threads respectively, means for adjusting said driven members relative to each other to cause opposed engagement with the worm threads and for positively holding them in such relation while allowing them to move, and mechanism adapted to be operated and connected with the driven members.

2. The combination of a worm shaft, worm threads thereon, a plurality of worm wheels having opposed engagement with different worm threads, and turning in the same direction for a given rotation of the worm shaft, means for constraining the worm wheels, and an operatable connection from the worm wheels.

3. In steering gearing, the combination, with a shaft carrying worm threads, a pair of transverse shafts, worm wheel segments rigid on said shafts meshing with the threads, arms on said shafts, and means for adjusting said arms with reference to each other while allowing them to turn in the same direction.

4. In steering gearing, the combination, with a suitable frame, of a shaft journaled therein and carrying worm threads, a pair of shafts journaled in the frame transversely of the worm shaft, a pair of worm segments rigid on said transverse shafts, arms on the transverse shafts outside of the frame, and means connecting said arms together and adapted to adjust their relative position to prevent undesirable back lash.

5. In steering gearing, the combination, with a worm shaft, a pair of worm segments coacting with different threads thereof respectively, arms connected with said segments, and a turn buckle connecting said arms.

6. In steering mechanism, the combination, with a casing, of a worm shaft having worm threads within the casing, a pair of transverse shafts journaled in the casing, worm wheel segments on said shafts within the casing meshing with the worm threads, a pair of arms outside the casing rigid on the respective transverse shafts, links and a turnbuckle connecting said arms, and a connection from one of said arms for mechanism adapted to be driven.

7. In steering gearing, the combination, with a rotatable worm shaft, of a plurality of worm wheels coacting therewith, and each having complete teeth and acting on different threads, means for constraining the worm wheels to cause opposed engagement with the worm while allowing them to turn in the same direction, and mechanism to be operated and connected with the worm wheels.

8. In steering gearing, the combination, with a rotatable worm driving shaft, of a pair of segmental worm wheels mounted on separated axes to coact therewith and turn in the same direction, and means for mutually constraining said worm wheels to cause engagement of their teeth with oppositely acting surfaces of the drive shaft.

9. The combination of a rotatable driving shaft having worm threads, a pair of worm-wheel members having teeth engaging different threads respectively of the driving shaft, said worm wheel members being mounted on parallel axes, a pair of arms connected respectively with the worm-wheel members, and a turn buckle connected to the two arms.

10. The combination of a rotatable shaft having worm threads, a pair of worm wheel members having teeth engaging different threads respectively of the driving shaft, said worm wheel members being mounted to turn in the same direction for a given rotation of the worm shaft, means for adjusting said worm wheel members relative to each other and holding them in such adjustment notwithstanding their movement, and an operating connection from the worm wheel members.

11. The combination, with a rotatable driving shaft having worm threads, of a pair of worm wheel members having teeth engaging different threads respectively of the driving shaft, said worm wheel members turning in the same direction for a given rotation of the worm shaft, arms on the worm wheel members, and an adjustable device pivotally connected with said arms.

In testimony whereof, I hereunto affix my signature in the presence of two witnesses.

VAN ZANDT M. MOORE.

Witnesses:
J. B. HULL,
A. L. LORD.

Copies of this patent may be obtained for five cents each, by addressing the "Commissioner of Patents, Washington, D. C."